United States Patent

[11] 3,552,525

| [72] | Inventor | Conrad R. Schudel |
| | | Danville, Calif. |
| [21] | Appl. No. | 798,645 |
| [22] | Filed | Feb. 12, 1969 |
| [45] | Patented | Jan. 5, 1971 |
| [73] | Assignee | Hexcel Corporation Dublin, Calif. |
| | | a corporation of California |

[54] ENERGY ABSORBER
8 Claims, 5 Drawing Figs.

[52] U.S. Cl. .................................................. 188/1; 73/12
[51] Int. Cl. .................................................. F16f 7/12
[50] Field of Search .................................. 73/11, 12; 188/1C

[56] References Cited
UNITED STATES PATENTS

| 3,010,540 | 11/1961 | Dahlen ........................ | 188/1(C) |
| 3,082,846 | 3/1963 | Jensen et al. ................. | 188/1(C) |
| 3,130,819 | 4/1964 | Marshall ...................... | 188/1(C) |

Primary Examiner—Duane A. Reger
Attorney—Townsend and Townsend

ABSTRACT: An energy absorber wherein a tubular honeycomb member having a conically tapered end is collapsed by an anvil. The anvil has a concavity to accommodate the collapsed conically tapered end of the tubular honeycomb member and compresses the honeycomb energy absorbent member along a wave front which is substantially normal to the direction of honeycomb collapse.

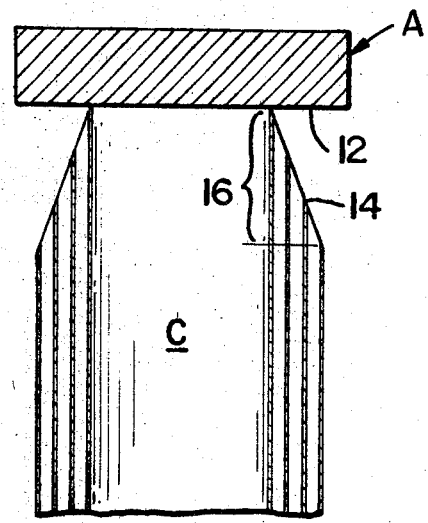
FIG_1
(PRIOR ART)
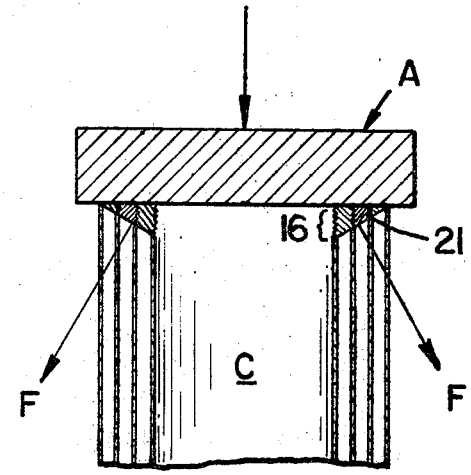
FIG_2
(PRIOR ART)
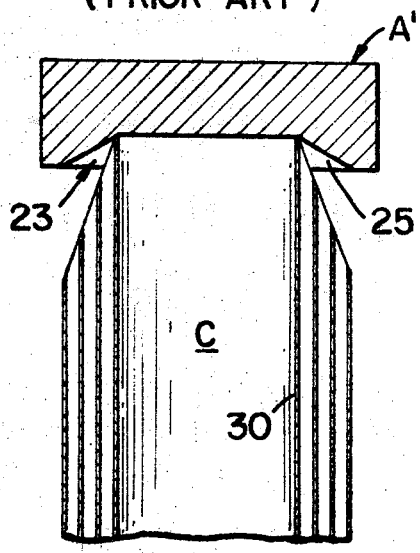
FIG_3
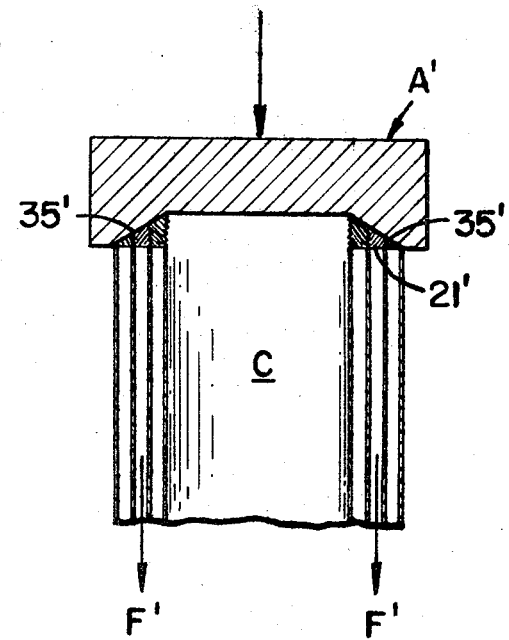
FIG_4
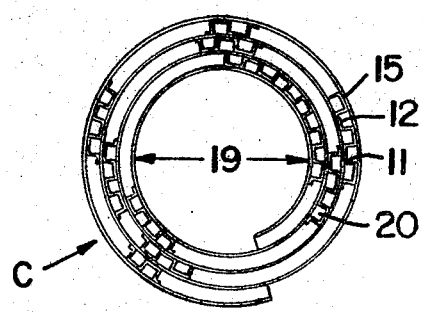
FIG_5
INVENTOR.
CONRAD R. SCHUDEL
BY
Townsend and Townsend
ATTORNEYS

3,552,525

ENERGY ABSORBER

This invention relates to an energy absorbing honeycomb structure.

Conventional honeycomb is noted for its uniform energy absorption characteristics when mechanical forces are applied between the columnar ends of honeycomb cells. Generally, in forming a honeycomb structure, a plurality of corrugated ribbons of sheet material such as metal foil, paper, plastic or the like are bonded together at spaced node points thereby fabricating a plurality of hollow multisided columnar cells, all extending axially in the same direction. Under the influence of mechanical forces applied to the columnar ends of the cells, the cell walls formed by the individual ribbons fold into small accordionlike pleats resulting in a compression of the structure and absorption of energy.

Honeycomb is typically used in destructible shock absorbers of the type wherein extraordinarily high forces are dissipated. Such energy absorbers are found in bomb fin retarders, landing gear shock absorbers for aircraft, and the like. A specific example of such a structure can be found in U.S. Pat. No. 3,130,819 entitled "Energy Absorber."

It is often desired to provide gradually increasing energy absorption. Honeycomb energy absorbing devices are known which have a wedge shaped end providing a gradually increasing resistance as the collapse of the honeycomb member commences. This increased resistance is imparted because the compressing member or anvil must collapse ever increasing cross sections of honeycomb as it crushes downwardly into the energy absorbing honeycomb wedge.

Anvils for compressing wedge shaped honeycomb members have heretofore comprised flat surfaces. These flat surfaces have compressed the honeycomb, accumulating the crushed honeycomb before the anvil in greater quantities where the taper of the wedge is the longest. The wedge shaped honeycomb, when compressed, forms angularly inclined wedge shaped configurations which have a wave front of collapse inclined at an angle with respect to the direction of honeycomb collapse. This inclined wave front has been found to stress the honeycomb angularly with respect to the axis honeycomb collapse. The angular stressing causes delamination of the bonded node points and shearing of the material of the honeycomb, especially where the honeycomb is pleated or is being pleated. This in turn results in the rupture, buckling and outward splaying of the cell wall, thereby reducing the number of aligned, effective energy absorbing cells and decreasing the energy absorption characteristics of the material. In this connection the bonded node points of most types of honeycomb are the structurally weakest points of the material, and hence the node points will usually fail (by delamination) before the ribbons themselves will collapse, shear, or otherwise fail.

An object of this invention is to provide an energy absorber of the type having a tapered honeycomb core in which the honeycomb collapse does not generate splaying or delamination forces. Accordingly, the compressing anvil is contoured with respect to the compressed tapered honeycomb member to provide a wave front of collapse normal to the direction of honeycomb collapse, preventing the generation of angular splaying forces.

A further object of this invention is to cause the collapsed and corrugated honeycomb material to lay up upon itself in a wave front normal to the direction of honeycomb collapse to form a uniform and advancing wave front from which further energy absorbing collapse can occur.

A feature and advantage of this invention is that the superior energy absorbing characteristics of a tapered honeycomb member are preserved in an energy absorber without the generation of delaminating forces.

An additional feature and advantage of this invention is that in a cylindrically shaped honeycomb core having a conically tapered end compressed by a conically apertured anvil, forces normal to the axis of honeycomb collapse between the wedge shaped honeycomb and anvil are precisely counterbalanced during collapse.

Other objects, features and advantages of the present invention will be more apparent after referring to the following specification and attached drawings in which:

FIG. 1 is a side elevation view of a tubular honeycomb energy absorber of the prior art before collapse at its conically shaped end;

FIG. 2 is a side elevation section of the energy absorber of FIG. 1 with its conically shaped end collapsed illustrating schematically the generation of splaying forces;

FIG. 3 is a side elevation section of the energy absorber of this invention illustrating an anvil having a concavity for accommodating the collapsed conically shaped portion of the honeycomb;

FIG. 4 is a side elevation section of the energy absorber of FIG. 3 illustrating the energy absorber with its conically shaped portion collapsed interior of the conically apertured anvil; and FIG. 5 is a plan section illustrating a construction of the honeycomb core.

With reference to FIGS. 1 and 2, a honeycomb energy absorber of the prior art is illustrated having an anvil A and a tubular and tapered honeycomb core C. Anvil A is provided with a flat compressing surface 12 and is shown overlying and contacting core C at the apex end of the conically tapered tube.

As illustrated in FIG. 5, core C is circular in plan. This core of foil, paper, plastic, or the like is formed from a plurality of corrugated ribbons 11 on sheet material 12 bonded together at spaced node points 15. As can be seen, the sheets are spirally wound about an inner diameter 19 so that a plurality of hollow multisided columnar cells 20 are formed extending longitudinally the length of the cylindrical core C.

Core C is provided at the end adjoining anvil A with a tapered surface 14. Surface 14 when viewed in section provides a wedge shaped honeycomb core member 16. This core member exposes the apex of the wedge shaped cross section of the core to anvil A. Anvil A when it crushes the wedge shaped honeycomb member 16 meets increasing energy absorbing resistance as the cross section of crushed honeycomb core progressively increases in area.

With reference to FIG. 2, the cross-sectional crushed configuration of the honeycomb is illustrated after complete collapse of wedge shaped cross section 16. As can be seen, the compressed wedge shaped cross section 16 occupies a reduced cross section 18 having an angularly inclined compression wave front 21. Wave front 21, being inclined with respect to the axis of honeycomb collapse, exerts an angularly inclined splaying force F with respect to the honeycomb core.

Two adverse conditions are created in the honeycomb by the configuration illustrated in FIG. 2. First, the forces generated by the collapsing wave front are no longer axial with the cells of the honeycomb. Instead these forces are inclined with respect to the honeycomb cells, where they stress the bonded nodes of the honeycomb and cause shearing of the honeycomb wall either where the material has been pleated or alternately is collapsing and being pleated. Secondly, the collapsed honeycomb has a tendency to slide angularly along the inclined wave front of collapse from the upward slope to the downward slope. This sliding tends to shear the pleated walls and prevent the collapsed honeycomb core from forming a solid base from which further uniform honeycomb collapse can occur.

With reference to FIG. 3, a honeycomb core C identical to that illustrated in FIG. 1 is shown. Overlying honeycomb core C there is an improved anvil A' having a defined concavity 23.

With reference to FIG. 4, the collapsed disposition of core 16 is shown at 21. As can be seen, the wedge shaped section 25 of anvil A' precisely accommodates wedge 23 immediately above a plane taken normal to the axis of honeycomb collapse. This aligns the wave front of honeycomb collapse 21' normally to the axis of honeycomb collapse. All the forces exerted from the wave front on the collapsing core are parallel to the direction of honeycomb collapse (schematically illustrated by arrows F'). As core C is progressively collapsed, wave front 21 will continue to advance along the length of the core disposed substantially normal to the axis of honeycomb collapse.

As illustrated in FIG. 4, the honeycomb progressively collapses into small accordionlike pleats along its entire crushed portion. As one characteristic of honeycomb is that its compression or columnar strength exceeds by 50 percent its strength when partially crushed, the tapered conical construction assures that initial collapse commences at the wedge shaped portion of the cone 16. Since it is desirable to assure that collapse begins to occur uniformly at one portion of the honeycomb, anvil A' will always first compress the tapered wedge shaped cross section 16 of the honeycomb and thereafter generate a wave front which moves progressively away from anvil A' parallel to the direction of honeycomb collapse.

It should be apparent that the wedged cross section 16 of the honeycomb core and anvil can be altered. This cross section can taper from the inner surface 30 of the core outwardly to the outer surface. Alternately, slope of the inclined portion of the wedge can be changed in configuration accordingly.

It will be noted that the inclined compressing surface of the honeycomb member 25 meets anvil A' along an inclined interface 35. Normally during compression of the honeycomb, a sliding of the anvil with respect to the core would be expected.

In the tubular honeycomb core here shown, such sliding forces are precisely counteracted. As can be seen for each interface 35 tending to slide, there is presented an oppositely inclined interface 35' which interface exerts a sliding force between the anvil and core in an opposite and opposed direction. The interaction of these diametrically opposed sliding interfaces between the anvil and core mutually cancel one another and assist in the centering of anvil A as it moves along core C in its energy absorbing crush.

It is preferred that the columnar alignment of the honeycomb be disposed along the axis of honeycomb collapse. This enables the honeycomb to resist crush along its axis of maximum strength where it maintains a highly uniform crush resistance.

The honeycomb energy absorber here shown has been tubular in configuration. While preferred, this is not necessary for the practice of this invention. Substantially any honeycomb core having a wedge-shaped cross section along planes parallel to the axis of collapse will suffice. Moreover, the cross section configuration of the honeycomb cells is not critical. This invention applies equally well to honeycomb having a hexagonal cell cross section as well as the corrugated spiral wound cross-sectional construction here illustrated. The only requirement that the utilized honeycomb construction must meet is that the honeycomb be capable of an accordionlike and pleated collapse along the axis of its defined cellular structure.

I claim:

1. An article of manufacture comprising: a wedge shaped honeycomb core; an anvil; energy absorbing means for forcing said honeycomb core into said anvil at the apex of said wedge shape for collapsing said honeycomb to a compressed wedge shaped cross section; said anvil contoured to maintain the lower surface of said compressed wedge shaped cross section parallel to the direction of honeycomb collapse.

2. The invention of claim 1 and wherein: said honeycomb core is tubular and conically tapered at one end of said tube.

3. The invention of claim 2 and wherein said conically shaped honeycomb tube defines a cone of constant slope converging from the outside surface of said tube inwardly towards the inside surface of said tube.

4. The invention of claim 1 and wherein said anvil defines a concavity interior thereof.

5. An energy absorber haVing gradually increasing energy absorbing characteristics of the type wherein a wedge shaped honeycomb core is compressed under the influence of mechanical forces, said absorber comprising: a honeycomb core consisting of a plurality of columnated ribbons bonded to one another at space node points, said ribbons defining a multitude of hollow columnar cells; said core being wedge shaped in cross section; anvil means adapted to contact the point of said wedge shaped honeycomb core at one end and crush said honeycomb along the longitudinal axis of said hollow columnar cells; said anvil means sloped with respect to said wedge shaped cross section to dispose the wave front of honeycomb collapse substantially normal to the direction of honeycomb compression whereby forces exerted at said wave front are directed parallel to the direction of honeycomb collapse.

6. The invention of claim 5 and wherein said honeycomb core comprises spirally wound columnated ribbons of sheet material having bonded node points; and said core is provided with a conically tapered end.

7. An energy absorber comprising: a honeycomb core having a decreasing cross-sectional area at one end thereof; an anvil corporatively contoured and engaging said honeycomb core at the decreased cross-sectional area for compression thereof; said anvil contoured with respect to said end of said core to direct the wave front of compression along said core normal to the direction of honeycomb collapse.

8. The invention of claim 7 and wherein said anvil is contoured for containing the compressed end of said honeycomb core immediately above a plane taken normal to the direction of honeycomb collapse.